(12) United States Patent
Schubert et al.

(10) Patent No.: US 11,866,105 B2
(45) Date of Patent: Jan. 9, 2024

(54) STEERING SYSTEM

(71) Applicant: Robert Bosch GmbH, Stuttgart (DE)

(72) Inventors: Frederik Schubert, Schwaebisch Gmuend (DE); Thomas Poetzl, Winnenden (DE)

(73) Assignee: Robert Bosch GmbH, Stuttgart (DE)

( * ) Notice: Subject to any disclaimer, the term of this patent is extended or adjusted under 35 U.S.C. 154(b) by 336 days.

(21) Appl. No.: 17/327,183

(22) Filed: May 21, 2021

(65) Prior Publication Data
US 2021/0362772 A1 Nov. 25, 2021

(30) Foreign Application Priority Data
May 25, 2020 (DE) ...................... 10 2020 206 429.6

(51) Int. Cl.
*B62D 5/04* (2006.01)
(52) U.S. Cl.
CPC ......... *B62D 5/0448* (2013.01); *B62D 5/0403* (2013.01); *B62D 5/0424* (2013.01)
(58) Field of Classification Search
CPC ..... F16H 55/52; B62D 5/0448; B62D 5/0403; B62D 5/0424; B62D 3/06; B62D 3/08
See application file for complete search history.

(56) References Cited

U.S. PATENT DOCUMENTS

| 9,809,245 B2 * | 11/2017 | László | B62D 5/0448 |
| 2004/0099472 A1 * | 5/2004 | Johnson | F16H 25/24 180/444 |
| 2013/0248280 A1 * | 9/2013 | Stamm | B62D 5/0451 180/444 |
| 2019/0118854 A1 * | 4/2019 | Tate | B62D 5/001 |
| 2022/0119034 A1 * | 4/2022 | Hetzel | B62D 5/0424 |

FOREIGN PATENT DOCUMENTS

| CN | 103889823 A | * | 6/2014 | B62D 5/0403 |
| DE | 10 2014 006 469 B3 | | 7/2015 | |
| DE | 10 2019 201 933 A1 | | 8/2020 | |
| ES | 2640251 T3 | * | 11/2017 | B62D 5/0424 |
| WO | WO-2018068932 A1 | * | 4/2018 | |
| WO | WO-2018068933 A1 | * | 4/2018 | |
| WO | WO-2020164774 A1 | * | 8/2020 | B62D 5/0424 |

* cited by examiner

*Primary Examiner* — Bobby Rushing, Jr.
(74) *Attorney, Agent, or Firm* — Maginot, Moore & Beck LLP

(57) ABSTRACT

A steering system has a steering rod longitudinally displaceable in a housing and a steering motor acting on the steering rod via a ball screw drive. The steering rod has a recirculating ball thread interacting via spherical transmission elements with a transmission nut driven by the steering motor and that is rotatably mounted by a bearing arrangement with a pivot bearing having an inner ring to which a mechanism wheel is fixedly attached. The transmission nut is pivotably mounted on the mechanism wheel about a pivot axis oriented perpendicularly to the longitudinal axis of the steering rod, and has a curved joint section which interacts with a curved joint section of the mechanism wheel to form a pivoting bearing. An elastically deformed spring ring arranged between the joint sections provides freedom from play of the pivoting joint.

10 Claims, 2 Drawing Sheets

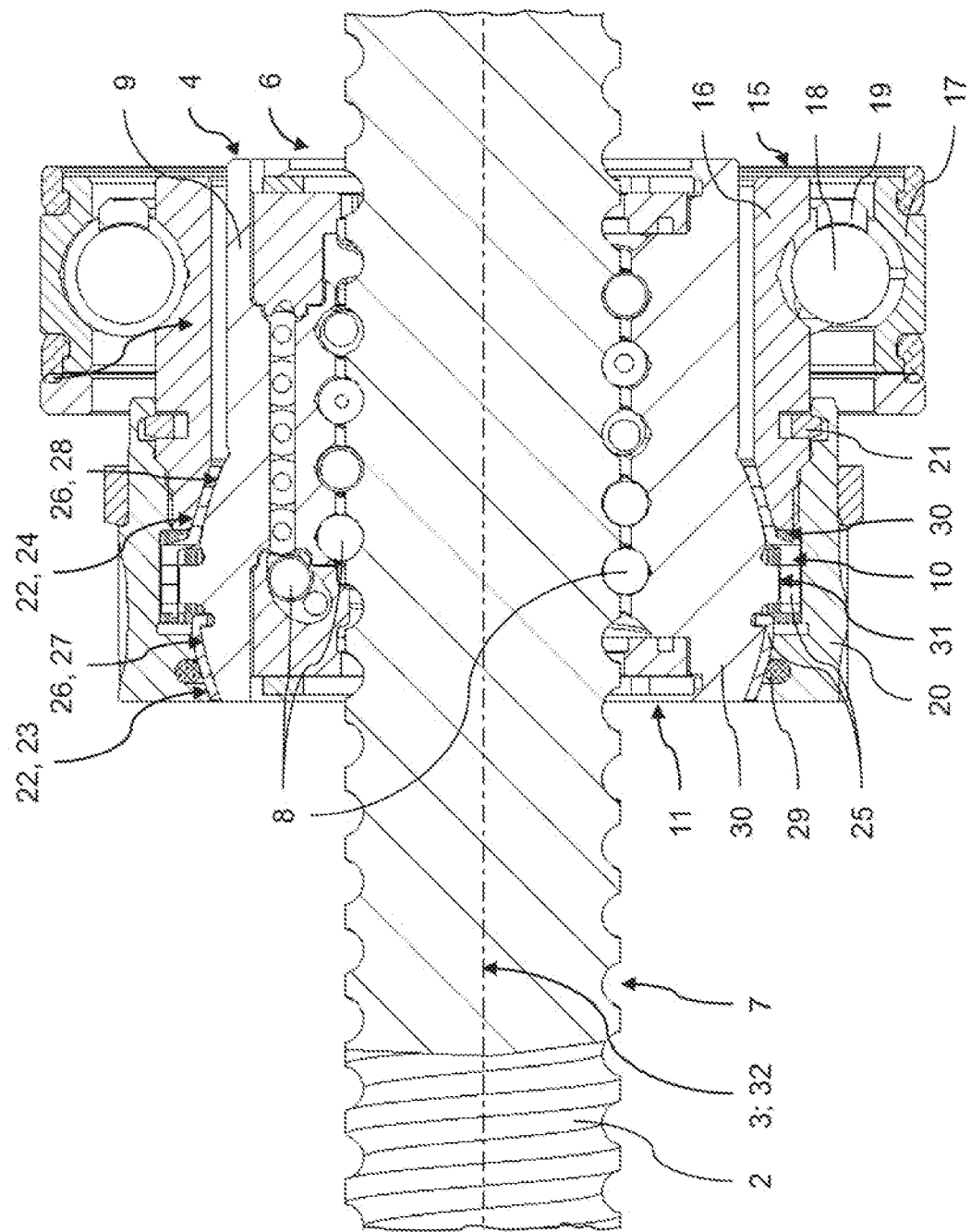

STEERING SYSTEM

This application claims priority under 35 U.S.C. § 119 to application no. DE 10 2020 206 429.6, filed on May 25, 2020 in Germany, the disclosure of which is incorporated herein by reference in its entirety.

The disclosure relates to a steering system with a steering rod which is mounted in a housing such that it can be displaced in a longitudinally axial manner, and with a steering motor which acts on the steering rod via a ball screw drive, to which end the steering rod configures a recirculating ball thread in at least one section which interacts with a transmission nut which can be driven by the steering motor, the transmission nut being mounted by means of a bearing arrangement such that it can be rotated within the housing.

BACKGROUND

A steering system of this type is known from DE 10 2014 006 469 B3. In this steering system, the transmission nut is mounted such that it cannot move in a retaining ring, which retaining ring, in order to configure a pivoting bearing, is configured to be convexly curved on the outer side and is mounted in an inner ring of a pivot bearing. The inner ring of the pivot bearing is correspondingly configured to be concavely curved on the inner side. The inner ring of the pivot bearing is also connected fixedly for conjoint rotation to a belt pulley.

German patent publication DE 10 2019 201 933 A1 likewise describes a steering system in accordance with the type mentioned in the introduction. Said steering system specifically comprises a steering rod which is mounted in a housing such that it can be displaced in a longitudinally axial manner, and a steering motor which acts on the steering rod via a ball screw drive, to which end the steering rod configures a recirculating ball thread which interacts via spherical transmission elements with a transmission nut which can be driven by the steering motor, the transmission nut being mounted by means of a bearing arrangement such that it can be rotated within the housing. Furthermore, a mechanism wheel of a flexible drive mechanism, via which mechanism wheel drive power of the steering motor can be transmitted to the transmission nut, is attached fixedly such that it cannot tilt to an inner ring of a pivot bearing of the bearing arrangement, the transmission nut being mounted on the mechanism wheel such that it can be pivoted about a pivot axis which is oriented perpendicularly with respect to the longitudinal axis of the steering rod. To this end, the transmission nut has a curved joint section which configures a pivoting bearing with a curved joint section of the mechanism wheel. A plain bearing layer can be arranged between the joint sections, by way of which a movement capability with as low a friction as possible of the pivoting bearing is to be realized. Here, the plain bearing layer can be configured in the form of a separate component made from plastic. Furthermore, a movable first part section of the joint section of the mechanism wheel is pressed elastically by means of a prestressed loading apparatus in the direction of a second part section of the joint section of the mechanism wheel, as a result of which a largely play-free state of the pivoting bearing is set. Said loading apparatus comprises two ring elements which in each case have an end side which is configured at least in sections as an oblique face, the oblique faces of the two ring elements making contact with one another, and the ring elements being loaded by means of a plurality of prestressed spring elements in order to carry out a relative rotation.

A relatively great adjustment travel for the first part section of the joint section of the mechanism wheel can be realized by means of a loading apparatus of this type, with simultaneously relatively small dimensions in the axial direction of the loading apparatus. A relatively great adjustment travel of this type may be required because the plain bearing layer which is configured as a separate component from plastic and is arranged between the joint sections of the mechanism wheel and the transmission nut is subject to a relatively great plastic deformation over the service life of the steering system as a consequence of settling of the plastic, which should be compensated for to a corresponding extent by way of the loading apparatus. Accordingly, a disadvantage of a steering system of this type is the relatively great structural complexity which is associated, in particular, with the provision of the relatively complex loading apparatus.

SUMMARY

The disclosure was based on the object of providing a steering system which is functionally advantageous and at the same time simple and inexpensive to produce.

Said object is achieved by means of a steering system as disclosed herein. Advantageous refinements of the steering system according to the disclosure and a method for mounting such a steering system result from the following description.

According to the disclosure, a steering system is provided which has at least one steering rod which is mounted in a housing such that it can be displaced in a longitudinally axial manner, and a steering motor, the steering motor acting on the steering rod via a ball screw drive, to which end the steering rod configures a recirculating ball thread in at least one section, which recirculating ball thread interacts via spherical transmission elements with a transmission nut which can be driven by the (preferably electric, possibly also hydraulic) steering motor. Here, the transmission nut is arranged within the housing such that it can be rotated by means of a bearing arrangement. Furthermore, a mechanism wheel of a flexible drive mechanism, for example of a toothed belt mechanism, via which mechanism wheel drive power of the steering motor can be transmitted to the transmission nut, is attached fixedly such that it cannot tilt and preferably also fixedly for conjoint rotation to an inner ring of a pivot bearing of the bearing arrangement which is preferably configured in the form of an anti-friction bearing. Here, "fixedly such that it cannot tilt" is understood to mean that tilting of the mechanism wheel about an arbitrary or about any tilting axis which lies perpendicularly with respect to its longitudinal axis is transmitted to the inner ring of the pivot bearing. Furthermore, it is provided that the transmission nut is mounted on the mechanism wheel such that it can be pivoted about an (in particular, about any) pivot axis which is oriented perpendicularly with regard to the longitudinal axis of the steering rod. It is provided to this end that the transmission nut has a curved, preferably partially spherically and/or convexly curved, joint section which interacts with a curved, preferably partially spherically and/or concavely curved, joint section which is configured at least partially, possibly completely, by the mechanism wheel for the configuration of a pivoting bearing. In order to realize as far as possible or at least sufficiently a freedom from play of the pivoting joint, at least one elastically deformed spring ring, in particular an elastomer ring, is arranged between the joint sections.

The transmission nut and/or the mechanism wheel can preferably be configured completely, but at least in the regions which configure the curved joint sections, from metal, in particular from steel and/or aluminum, in order to ensure a load-bearing capability which is as high as possible and in particular also minimum settling behavior.

On account of a configuration of this type of a steering gear, in the case of which configuration a pivoting bearing which ensures the pivoting capability of the transmission nut is configured on the mechanism wheel and not on the pivot bearing itself, decoupling of the transmission nut, which is pivoted as a consequence of a corresponding bending load of the steering rod, from the pivot bearing can be achieved, as a result of which a plurality of advantages can be realized. One of these advantages lies in an automatic elimination of play of the pivot bearing, as a result of which undesired noise development can be avoided or reduced. This automatic elimination of play of the pivot bearing is based on the tilt-proof attachment of the mechanism wheel to the inner ring of the pivot bearing in conjunction with the decoupling, realized, furthermore, by way of the configuration according to the disclosure of the steering system, of the pivot bearing from pivoting movements of the transmission nut, which decoupling is realized by way of the configuration of the pivoting bearing in the region of the mechanism wheel. In this way, bearing play and, in particular, axial play of the pivot bearing can namely be eliminated by way of the tensile loading of the flexible drive mechanism, which tensile loading acts on the mechanism wheel, by said tensile loading leading to slight tilting of the inner ring of the pivot bearing, which tilting is decoupled from pivoting movements of the transmission nut.

Furthermore, as a consequence of the configuration according to the disclosure of a steering system, decoupling of the transmission nut from a tensile load of the mechanism wheel of the flexible drive mechanism can be realized, which has a positive effect with regard to frictional resistance which is as optimum as possible and, in particular, is also constant being achieved in the relative movements of the ball screw drive.

At the same time, despite these advantages which can be achieved, a steering system according to the disclosure can have a construction which is relatively simple in structural terms and is therefore also robust and inexpensive. Play in the pivot joint, which play would be set at least during the service life of the steering system as a consequence of wear, is compensated for in the case of the steering system according to the disclosure by way of the elastically deformed spring ring which presses the joint sections directly or indirectly against one another without play at least in sections.

It can be provided in accordance with one preferred embodiment of a steering system according to the disclosure that a plain bearing layer is arranged between the joint sections. This plain bearing layer can preferably be configured as a separate component and/or from plastic (for example comprising PTFE) which enables simple and inexpensive production alongside good functionality with regard to achieving a coefficient of friction of the pivoting bearing which is as low as possible. Alternatively, however, there is also the possibility, for the configuration of the plain bearing layer, of providing at least one of the joint sections with a sliding coating, and/or of arranging a lubricant, in particular a pasty lubricant, for example a lubricating grease, between the joint sections. Here, a "sliding coating" is understood to mean a coating which is arranged fixedly on a surface of a main body of the mechanism wheel or of the transmission nut, which coating is configured from a material which differs from the material of the main body. Here, the material can be, in particular, a sliding material which, in combination with that material from which the mating contact face is configured, has a relatively low and, in particular, as low as possible a coefficient of friction. A sliding coating which is advantageous for the provided use can comprise, possibly mainly, polyoxymethylene (POM) and possibly additionally polytetrafluoroethylene (PTFE).

If the material of the plain bearing layer has a pronounced settling behavior under loading, an increasing play which results from settling of this type in the pivoting bearing can in turn be compensated for by the elastically deformed spring ring, which possibly necessitates correspondingly large dimensioning of the spring ring with regard to the elastic restoring action and therefore, in particular, also with regard to the cross-sectional size.

In order to as far as possible avoid a play of the pivoting bearing, which play increases during the service life of the steering system, as a consequence of settling of the material of the plain bearing layer, it can preferably be provided for settling of this type to be at least partially pre-empted as early as within the context of the mounting of the steering system. For this purpose, it can be provided in accordance with a method according to the disclosure for mounting a corresponding steering system that a width of a joint gap which lies between the joint sections and receives the plain bearing layer is set, which width is smaller (in at least one section, preferably overall) than the thickness of the plain bearing layer in the unloaded state.

Since in the case of a steering system according to the disclosure sufficient freedom from play of the pivot ring can be ensured by the spring ring, it is possible to dispense with a complex loading apparatus such as is described in the German patent application DE102019201933.1, whereby a simple and inexpensive structural configuration of the steering system is obtained. In particular, this also makes it possible that a first part section of the joint section of the mechanism wheel and a main body of the mechanism wheel which has a functional surface which makes (direct) contact with a flexible drive of the flexible drive mechanism are configured in one piece, which enables particularly simple and expensive production.

It can be provided in accordance with one preferred embodiment of a steering system according to the disclosure that the mechanism wheel is configured as a mechanism internal gear, and the joint section of the transmission nut is arranged at least partially, possibly completely, within the mechanism wheel. As a result, a particularly compact configuration of the steering system at least with regard to the extent along the longitudinal axis of the steering rod can be realized.

In order to realize a direct transmission of drive power of the steering motor from the mechanism wheel which is part of the flexible drive mechanism to the transmission nut, it can be provided in accordance with one preferred refinement of a steering system according to the disclosure that the mechanism wheel is connected to the transmission nut by means of a coupling fixedly for conjoint rotation, that is to say in a torque-transmitting manner. Here, the coupling is configured in such a way that it ensures the pivoting capability of the pivoting joint despite the fixed connection for conjoint rotation.

A coupling which can advantageously meet these requirements has a toothing system of the mechanism wheel, preferably an internal toothing system (in particular, in the case of the preferred embodiment of the mechanism wheel as a mechanism internal gear) and a toothing system, preferably an external toothing system of the transmission nut, which toothing systems interact in a manner in which they engage into one another, in order to transmit a torque. Here, the teeth of said toothing systems can preferably be oriented parallel to the longitudinal axis of the steering rod. Furthermore, the teeth can preferably have tooth tips which run in a curved manner and/or tooth flanks which are configured in a curved manner, with the result that the coupling can then be configured in the form of what is known as a curved tooth coupling. Since said toothing systems which engage into one another of the mechanism wheel and the transmission nut can be part of the pivoting joint, it can preferably be provided that a plain bearing layer is likewise arranged between said toothing systems. As a result, a movement capability of the pivoting joint with as low a friction as possible can be ensured. This plain bearing layer can preferably here likewise be configured as a separate component and/or from plastic and particularly preferably in one piece with and from the same material as a plain bearing layer which is arranged at least in a section between the joint sections. In addition or alternatively, it can also be provided that at least one of the toothing systems is provided (at least in sections) with a sliding coating and/or a lubricant is arranged between the toothing systems which engage into one another.

An integration of the clutch, which integration is advantageous, in particular, with regard to the dimensions but also with regard to the function, can be achieved by virtue of the fact that said clutch is arranged (preferably centrally) between a first part section and a second part section of the joint section of the transmission nut and/or between a/the first part section and a second part section of the joint section of the mechanism wheel.

Furthermore, it can be provided in accordance with one preferred embodiment of a steering system according to the disclosure that the transmission nut is arranged within the inner ring of the pivot bearing with a defined radial play (that is to say, at a defined spacing over the entire circumference of the transmission nut). Here, the radial play can preferably be selected to be so great that a contact between the transmission nut and the inner ring is avoided in the case of all oblique positions between said components which are to be expected and/or which occur during normal operation of the steering system. Here, the partial arrangement of the transmission nut within the pivot bearing makes a compact embodiment of the steering gear of the steering system possible with, at the same time, a relatively great length of the transmission nut, which in turn has an advantageous effect with regard to the magnitude of the drive power which can be transmitted via the ball screw drive. Here, despite this arrangement, the radial play ensures the decoupling of the pivot bearing from pivoting movements of the transmission nut.

The (preferably only) pivot bearing of the bearing arrangement of a steering system according to the disclosure can advantageously be a single-row ball bearing, in particular a four-point bearing (e.g. in accordance with DIN 628), which, despite its suitability for the transmission of relatively high axial forces, makes a relatively inexpensive configuration of the steering system possible.

The tilt-proof and preferably also fixed attachment of the mechanism wheel for conjoint rotation to the inner ring of the pivot bearing can be realized firstly by virtue of the fact that they are configured in one piece, that is to say they represent the same component. There is likewise the possibility that they are configured as separate components and are correspondingly connected to one another.

The steering system according to the disclosure can preferably be configured as a power steering system, and can therefore make it possible for a manually generated steering torque which is transmitted via a steering handle (for example, a steering wheel) and preferably with the interposition of a steering column to a steering gear to be superimposed with a steering torque which is generated by the steering motor, in order to reduce the magnitude of the steering torque which is required for steering and is to be generated manually (possibly temporarily also as far as zero). Here, the steering gear can comprise, in particular, a steering pinion which interacts with a toothing system which is configured by the steering rod in one section. Secondly, the steering system can also be configured in such a way that the steering motor always provides the entire drive power which is required for steering.

The disclosure also relates to a motor vehicle, in particular a wheel-based and not rail-bound motor vehicle, preferably a passenger motor car or a truck, with a steering system according to the disclosure.

BRIEF DESCRIPTION OF THE DRAWINGS

The disclosure will be described in greater detail in the following text on the basis of one exemplary embodiment which is shown in the drawings, in which:

FIG. 2 shows the ball screw drive of the steering system according to FIG. 1.

DETAILED DESCRIPTION

Figure 1:
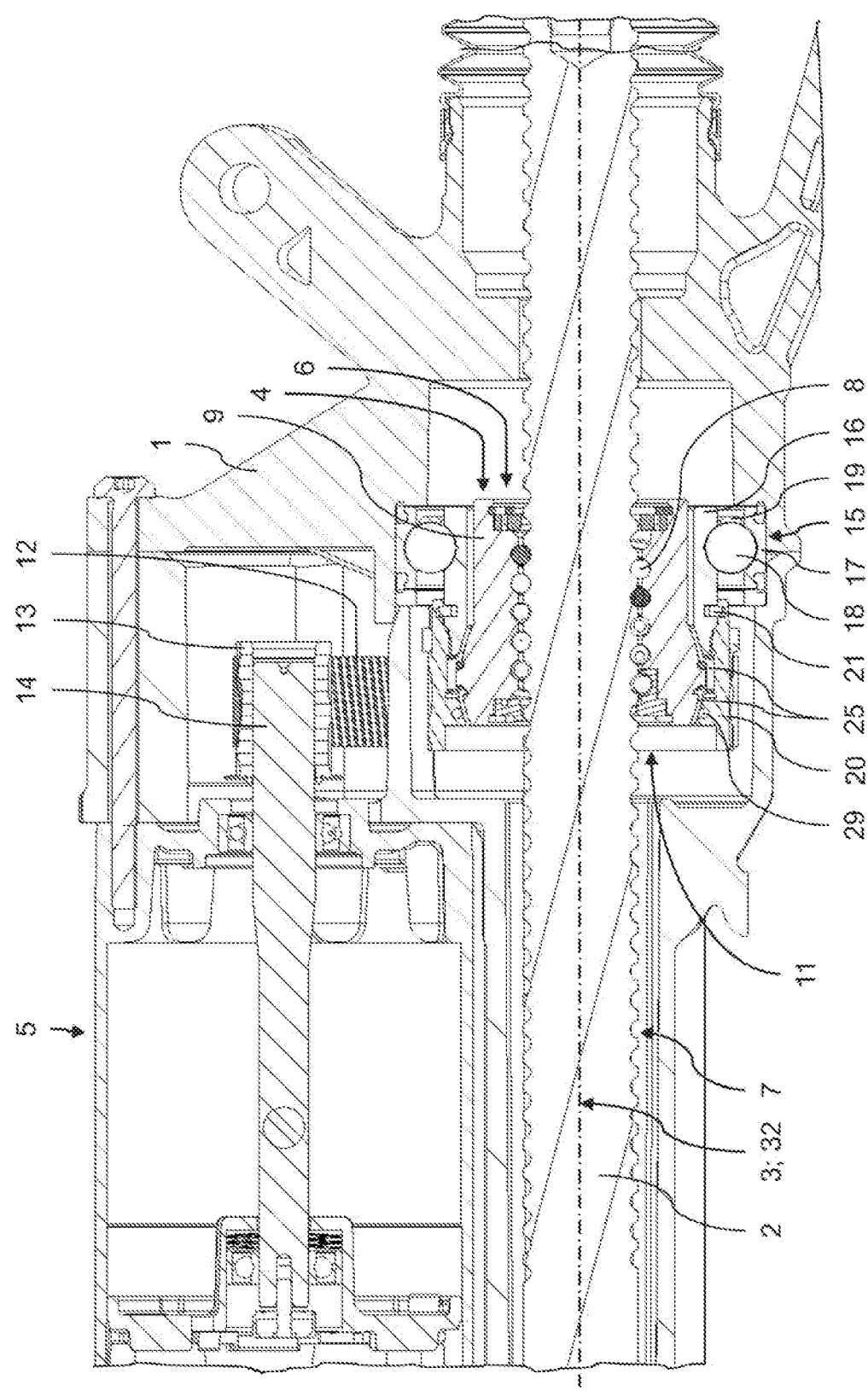
FIG. 1 shows a portion of a steering system according to the disclosure in a longitudinal section.

FIG. 1 shows a portion of a steering system according to the disclosure which is configured as a power steering system. The steering system comprises a multiple-piece, substantially tubular housing 1, within which a steering rod 2 is mounted such that it can be moved in a longitudinally axial manner, that is to say along its longitudinal axis 3. At its two ends, the steering rod 2 is connected in each case to a ball joint (not shown), said ball joints in turn serving for the connection to in each case one wheel steering arm (not shown). The wheel steering arms convert a longitudinally axial movement of the steering rod 2 into pivoting of steered wheels (not shown) of a motor vehicle.

A longitudinally axial movement of the steering rod 2 is brought about firstly by way of the generation of a rotational movement of a steering handle (not shown), in particular of a steering wheel, of the motor vehicle, said rotational movement of the steering handle being transmitted via a steering column (not shown) to a steering pinion (not shown). To this end, the steering pinion can interact with a toothing system (not shown) of the steering rod 2, in order to convert the rotational movement of the steering pinion into a translational movement of the steering rod 2 along its longitudinal axis 3.

Furthermore, a longitudinally axial movement of the steering rod 2 can be brought about by way of the generation of an auxiliary steering torque by means of a steering motor 5 which is of electric configuration in the present exemplary embodiment. To this end, the drive power of the steering motor 5 is transmitted, inter alia, by means of a ball screw drive 6 to the steering rod 2, to which end the steering rod 2 configures a recirculating ball thread 7 with a partially circular thread groove cross section in one section. A plurality of spherical transmission elements 8 are arranged within a section of the recirculating ball thread 7, which section is variable during steering, which transmission elements 8 are in addition received within the running grooves of a recirculating ball thread, which running grooves likewise have partially circular cross sections, which recirculating ball thread is configured on the inner side of the main body 9 of a transmission nut 4 of the ball screw drive 6. As a consequence of a corresponding mounting in a bearing arrangement, the transmission nut 4 of the ball screw drive 6 is integrated into the housing 1 such that it can be rotated but at the same time is substantially fixed or immovable with regard to its longitudinal axial directions. A rotational drive of the transmission nut 4 takes place with the interposition of a further mechanism stage in the form of a flexible drive mechanism which is configured as a belt drive in the exemplary embodiment which is shown, to which end the transmission nut 4 is connected to a first mechanism wheel (pulley wheel) 11 fixedly for conjoint rotation or in a torque-transmitting manner. The first mechanism wheel 11 is wrapped around partially by a belt 12 (in the form of a toothed belt here), the belt 12 being guided, furthermore, over a second mechanism wheel 13 which is connected to an output shaft 14 of the steering motor 5 fixedly for conjoint rotation. As a consequence, a rotational movement of the output shaft 14 of the steering motor 5 is transmitted via the belt drive to the transmission nut 4 of the ball screw drive 6, a step-down transmission (transmission ratio i>1) of the rotational speeds taking place. Said rotational movement of the transmission nut 4 is then converted into a translational movement of the steering rod 2.

Since, in the case of the conversion of a longitudinally axial movement of the steering rod 2 into a pivoting movement of the wheels of the motor vehicle, considerable transverse forces can act via the wheel steering arms on the ends of the steering rod 2, this results, in combination with the relatively great spacings between the ends of the steering rod 2 and that transmission nut 4 which brings about a radial support of the steering rod 2, in a relatively great potential for a flexural deflection of the ends of the steering rod 2. A flexural deflection of this type can possibly be kept as small as possible by virtue of the fact that the steering rod 2 is additionally mounted and, as a result, is supported radially in the vicinity of the longitudinally axial ends of the housing 1. Nevertheless, a relevant oblique position or tilting of the steering rod 2 in the region of the transmission nut 4 of the ball screw drive 6 cannot always be avoided.

In order to ensure as low-friction an operation of the ball screw drive 6 as possible, even in the case of an oblique position of this type of the steering rod 2 in the region of the transmission nut 4, the transmission nut 4 should likewise be capable of being tilted into a corresponding oblique position. At the same time, the longitudinal forces and transverse forces which are applied to the steering rod 2 also have to be supported by means of the mounting of the transmission nut 4 within the housing 1. To this end, both the bearing arrangement should be mounted as far as possible without play in the longitudinally axial and also in the radial direction within the housing 1, and the transmission nut 4 also has to be received correspondingly without play within the bearing arrangement.

To this end, the bearing arrangement comprises a pivot bearing 15 in the form of a single-row four-point bearing (in accordance with DIN 628) which, in addition to an inner ring 16, also comprises an outer ring 17, furthermore a plurality of rolling bodies 18 in the form of balls which are arranged between said bearing rings 16, 17, and a rolling body cage 19. The outer ring 17 of the pivot bearing 15 is mounted directly in a bearing seat of the housing 1 and is fixed axially here. The inner ring 16 of the pivot bearing 15 protrudes with one of its axial end sections beyond the outer ring 17, and is connected by way of said end section to the first mechanism wheel 11 such that it cannot tilt. This tilt-resistant connection is realized by way of a securing ring 21 which engages into in each case one circumferential groove of the inner ring 16 of the pivot bearing 15 and of the main body 20 of the first mechanism wheel 11. In addition or as an alternative, however, a different type of positively locking and/or non-positive connection can also be provided, for example a screw connection, and/or an integrally joined connection, for example by means of welding or soldering.

Furthermore, the bearing arrangement comprises a pivoting bearing for the pivotable mounting of the transmission nut 4 and the first mechanism wheel 11 on one another. Said pivoting bearing is configured by the transmission nut 4 in interaction with the first mechanism wheel 11 and the inner ring 16 of the pivot bearing 15. To this end, the main body 20 of the first mechanism wheel 11 is configured as an internal gear, two part sections 23, 24 of a joint section 22 which runs in a partially spherically and concavely curved manner being arranged on the inner side of the main body 20. Here, a first part section 23 of the joint section 22 of the first mechanism wheel 11 is configured by the main body 20 of the first mechanism wheel 11 itself, whereas a second joint section 24 is configured by that end section of the inner ring 16 of the pivot bearing 15 which protrudes into the main body 20. The joint section 22 of the first mechanism wheel 11 makes contact, with interposition of a two-part plain bearing layer 25 which is in the form of two separate components made from plastic, with a correspondingly partially spherically and convexly curved joint section 26 of the transmission nut 4, said joint section 26 of the transmission nut 4 likewise having a first part section 27 and a second part section 28 which make contact (indirectly) with the corresponding part sections 23, 24 of the joint section 22 of the first mechanism wheel 11.

The transmission nut 4 is arranged partially (specifically, with, inter alia, the entire joint section 26) within the first mechanism wheel 11, and partially with the configuration of a defined radial play within the pivot bearing 15, i.e. also within the outer ring 17 of the pivot bearing 15, said radial play being of such great dimensions that, in the case of the pivoting angles of the transmission nut 4 which are to be expected during operation of the steering system, contact between said transmission nut 4 and the inner ring 16 of the pivot bearing 15 is avoided.

As a result of the configuration of the plain bearing layer 25 in the form of two separate components made from plastic, relevant settling of the plastic of the plain bearing layer 25 can occur on account of the relatively great wall thicknesses of these components over the service life of the steering system. In order to ensure freedom as far as possible of play of the pivoting joint even during the entire service life of the steering system, it is provided firstly for a setting of this type to be pre-empted as far as possible as early as within the context of the mounting of the steering system. It is provided for this purpose that, in the case of the mounting of the steering system, the width for the joint gap which lies between the joint sections 22, 26 and receives the plain bearing layer 25 is set in such a way that it is considerably smaller than the thickness of the plain bearing layer 25 in the unloaded state. This leads to a deformation of the plain bearing layer 25, which deformation is (also) plastic, which, although it is initially associated with a relatively great frictional resistance of the pivoting bearing, this frictional resistance is decreased again relatively rapidly as a result of settling of the plastic of the plain bearing layer 25. Against this background it is therefore essentially sufficient to compensate for play which can be set on account of wear during the use of the steering system. In order to ensure this, an elastically deformed spring ring 29 in the form of an elastomer ring is arranged between the joint sections (22, 26). This ring brings about a prestressing force which is also directed in the longitudinally axial direction of the first mechanism wheel 11 and the transmission nut 4, as a result of which the transmission nut 4 is pressed in the direction of the pivot bearing 15 relative to the first mechanism wheel 11, which leads to bearing without play at least of the second part section 28 of the joint section 26 of the transmission nut 4 against the second part section 24 of the joint section 22 of the first mechanism wheel 11.

For the transmission of a torque from the first mechanism wheel 11 to the transmission nut 4, a coupling is provided which is configured by an annularly circumferential internal toothing system 30 of the first mechanism wheel 11 and a likewise annularly circumferential external toothing system 31 of the transmission nut 4, and by an intermediate tooth ring 10 made from plastic which interacts with both this internal toothing system 30 and with this external toothing system 31. Here, the internal toothing system 30 of the first mechanism wheel 11 and the external toothing system 31 of the transmission nut 4 (and thus also the corresponding toothing systems of the intermediate tooth ring 10) are arranged in each case in a longitudinally axially central manner between the two part sections 23, 24:27, 28 of the associated joint section 22, 26. In addition, the teeth of said toothing systems 30, 31 are oriented in parallel with regard to the longitudinal axis 3 of the transmission nut 4 or to the longitudinal axis 32 of the first mechanism wheel 11. Furthermore, the tooth tips of the external toothing system 31 of the transmission nut 4 have a curved profile, in order to configure a curved tooth coupling which does not impede the pivoting of the transmission nut 4 relative to the first mechanism wheel 11. The intermediate tooth ring 10 is configured in one piece with and from the same material as that part of the plain bearing layer 25 which is arranged between the respective first part sections 23, 27 of the joint sections 22, 26. The intermediate tooth ring 10 is therefore a part of the plain bearing layer 25. As a result, a pivoting movement capability of the pivoting joint with as low a friction as possible is ensured.

The invention claimed is:

1. A steering system comprising:
   a steering rod mounted in a housing such that the steering rod is displaceable in a longitudinally axial manner, the steering rod having a recirculating ball thread;
   a steering motor;
   a ball screw drive via which the steering motor acts on the steering rod, the ball screw drive including a transmission nut that is driven by the steering motor and that interacts via spherical transmission elements with the recirculating ball thread of the steering rod;
   a pivot bearing that mounts the transmission nut such that the transmission nut is rotatable within the housing;
   a flexible drive mechanism having a mechanism wheel via which power of the steering motor is transmitted to the transmission nut, the mechanism wheel fixedly attached to an inner ring of the pivot bearing such that the mechanism wheel cannot tilt, wherein the transmission nut is mounted on the mechanism wheel such that the transmission nut is pivotable about a pivot axis oriented perpendicularly with respect to a longitudinal axis of the steering rod, the transmission nut having a first curved joint section that interacts with a portion of a second curved joint section defined by the mechanism wheel so as to provide a pivoting bearing about which the transmission nut is pivotable about the pivot axis; and
   an elastically deformed spring ring arranged in a groove in the second curved joint section and extending toward the first curved joint section.

2. The steering system according to claim 1, further comprising a plain bearing layer arranged between the first and second curved joint sections.

3. The steering system according to claim 2, wherein the plain bearing layer is configured as a separate component and/or the plain bearing layer is formed from plastic.

4. The steering system according to claim 1, wherein:
   the mechanism wheel includes a main body with a functional surface which makes contact with a flexible drive of the flexible drive mechanism, and
   the portion of the curved joint section defined at least partially by the mechanism wheel and the main body are configured as one piece.

5. The steering system according to claim 1, wherein the mechanism wheel is configured as a mechanism internal gear, and the first curved joint section of the transmission nut is arranged at least partially on an inner side of the mechanism wheel.

6. The steering system according to claim 1, wherein the mechanism wheel is connected in a torque-transmitting manner to the transmission nut via a coupling.

7. The steering system according to claim 6, wherein the coupling comprises a toothing system of the mechanism wheel and a toothing system of the transmission nut, which engage into one another.

8. The steering system according to claim 7, further comprising an intermediate tooth ring arranged between the toothing system of the mechanism wheel and the toothing system of the transmission nut.

9. The steering system according to claim 6, wherein:
   one or both of the first curved joint section and the second curved joint section includes a first part section and a second part section, and
   the coupling is arranged between the first part section and the second part section.

10. A method for mounting a steering system, which includes (i) a steering rod mounted in a housing such that the steering rod is displaceable in a longitudinally axial manner, the steering rod having a recirculating ball thread, (ii) a steering motor, (iii) a ball screw drive via which the steering motor acts on the steering rod, the ball screw drive including a transmission nut that is driven by the steering motor and interacts via spherical transmission elements with the recirculating ball thread of the steering rod, (iv) a pivot bearing that mounts the transmission nut such that the transmission nut is rotatable within the housing, (v) a flexible drive mechanism having a mechanism wheel via which power of the steering motor is transmitted to the transmission nut, the mechanism wheel fixedly attached to an inner ring of the pivot bearing such that the mechanism wheel cannot tilt, wherein the transmission nut is mounted on the mechanism wheel such that the transmission nut is pivotable about a pivot axis oriented perpendicularly with respect to a longitudinal axis of the steering rod, the transmission nut having a first curved joint section that interacts with a second curved joint section defined at least partially by the mechanism wheel so as to provide a pivoting bearing about which the transmission nut is pivotable about the pivot axis, and (vi) an elastically deformed spring ring arranged in a groove in the second curved joint section and extending toward the first curved joint section, the method comprising:

setting a width for a joint gap, which lies between the first and second curved joint sections and receives the plain bearing layer, smaller than a thickness of the plain bearing layer in an unloaded state.

* * * * *